Oct. 10, 1944.  C. J. CAWLEY  2,360,199
TETHERING POST
Filed Sept. 13, 1943

Inventor
Clayton J. Cawley.

By Henry C. Stauffer
His Attorney

Patented Oct. 10, 1944

2,360,199

UNITED STATES PATENT OFFICE 2,360,199

TETHERING POST

Clayton J. Cawley, Eldred, Pa.

Application September 13, 1943, Serial No. 502,155

2 Claims. (Cl. 119—121)

The invention is in fastening devices, intended primarily for securing animals, and limiting their movement to a predetermined and limited locality; and more particularly small animals, as dogs, goats, calves, etc.; but of course it can be used to secure larger animals as well, the size of the structure being determined, within wide limits, by the size of the animal to be restrained.

One of the objects of the invention is to prevent the tied animal from entangling the rope or chain by which it is secured. To this end, the post proper, to which the cord or chain is secured, is provided with a plate or rest which closely contacts the ground, and on which a cylinder which surrounds the post, rotates freely. The cylinder is provided with an opening near the bottom thereof, through which the rope or chain is passed, in order that it may be secured around the post proper.

As the animal thus secured moves around the post, the tether; that is, the rope or chain proper, instead of winding on the post, tends to wind on the cylinder. A pull on the tether will tend to drag the cylinder around the post, thus unwinding the tether. The cylinder thus, in a very proper sense, becomes a guard against the entangling of the rope or chain by which the animal is secured.

The cylinder is of such a size, and rotates so freely around the post, that the rope or chain cannot become permanently entangled; for the guard is always free to rotate, and thus always releases the tying device. The plate or rest is maintained close on the ground so that the tying device cannot pass thereunder.

Referring to the accompanying drawing.

Figure 1:
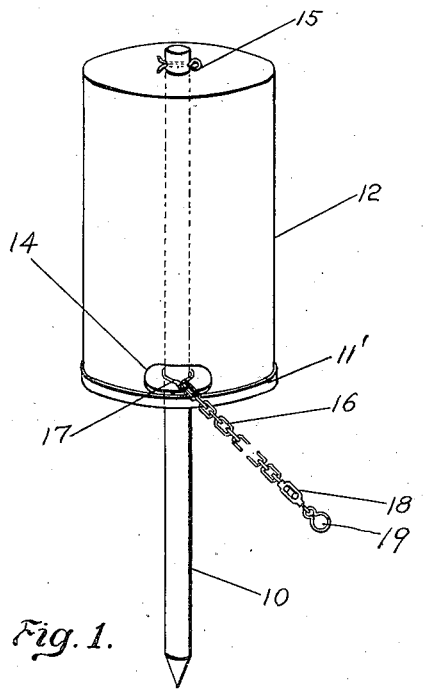
Fig. 1 is a perspective view of my invention before being set in the earth.
Figure 2:
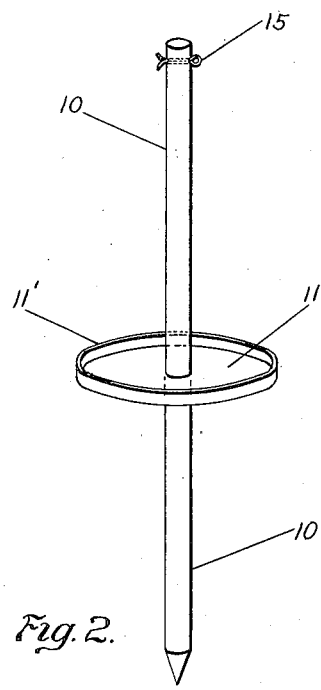
Fig. 2 is a view of the post with the stop plate affixed thereto.

The invention comprises but few parts; is simple to construct; and is easy to operate. Essentially, it comprises three principal parts; namely, a post proper 10; a shelf or disk 11, welded or otherwise rigidly secured to the post at a distance from either end thereof; and a cylindrical guard 12, mounted for free rotation on the shelf and around the post.

The length of the post is determined by the use to which the device is to be put; for large and strong animals, it should be longer and stronger than for smaller and more easily restrained animals. The post is to be secured to a suitable support, and, as here shown, is to be driven into the ground wherever convenient, and may be readily moved from place to place as circumstances require.

The shelf or disk 11, as just stated, is secured to the post 10 in any convenient manner. This element really serves several purposes; first, it serves to stop the post when the latter shall have been forced into the ground a sufficient distance; second, it functions as a support for the cylindrical guard 11; and third, it operates to prevent the chain or cord by which the animal is secured from winding around the post beneath the shelf.

The element 12, here termed the "guard," is essentially merely a cylinder of any suitable material, as sheet metal, heavy screen wire, or even of slats secured to a suitable frame. The bottom may be open or closed, and rests on the plate 11, as best shown in Fig. 1. It is here shown with a solid top, having therein at or about the center a hole or opening 13, of a size to pass freely over the post 10. At or near the bottom, the cylinder is provided on the side with an opening 14, through which the tether proper passes freely.

Through the upper part of the post, near the top thereof, a cotter pin, or other suitable stop, holds the guard on the post. The guard is thus restrained by the pin 15, from moving off the post, but at the same time can rotate freely between the shelf or disk 11 and the pin 15. Fine adjustment is not required.

Preferably, the cylinder is provided with a bottom having a hole therein similar to the hole 13 in the top, so that it will simply rotate around the post 10 between the disk 11 and the stop or pin 15 in the top of the post. If the cylinder does not have a bottom, then the lower end thereof, which still must rotate on the disk 11, is restrained in any suitable way, as by the rim 11' around the margin of the disk, so that the guard cannot move off the disk.

The tether proper may be of any suitable material. It is here shown as a chain 16, having a ring 17 at one end which passes freely around the post 10; and preferably somewhere in its length has a swivel 18, and at its end a ring or other suitable fastening element 19. However, the character of the tethering element is not of the essence of the invention, as any suitable tying means may be used.

The rope or chain 16 is passed through the opening 14 of the guard 12; so that, as the tied animal moves around within the predetermined area, the tether will have the tendency to drag the guard around the post. The guard 12 must move freely on the plate 11, but the play between the two should be quite limited, so that the rope or chain will not be caught between the guard and the shelf 11.

The opening 14 in the side of the guard is preferably relatively near the lower edge thereof; but the exact position is not necessarily that shown.

Figure 4:
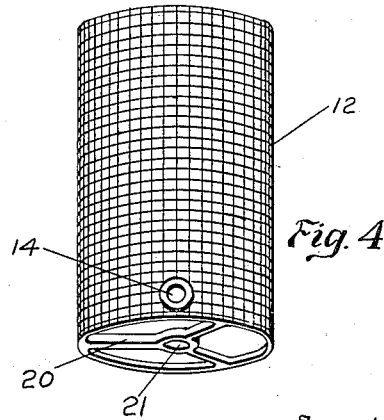
Fig. 4 is a perspective view of another form of guard, which functions as does the guard of Fig. 3.

The bottom of the guard, instead of being made of a sheet like the top, may be provided with a transverse bar or spider, having an opening therein to pass over the post, as shown in the modified construction of Fig. 4, where the bar or spider is indicated by the character 20, and the opening therein by 21. In fact such spiders may be used at both top and bottom of the guard.

When in use, the plate 11 should rest solidly on the ground, so that the tether cannot work thereunder and be wrapped around the post 10.

Figure 3:
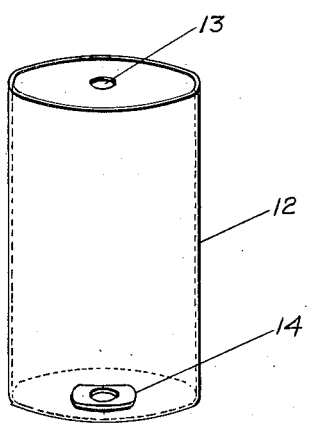
Fig. 3 is a perspective view of the cylindrical guard, which is to be mounted for rotation on the plate and around the post.

The form of guard shown in Fig. 4 does not need extended description. It is illustrated as being constructed of reasonably heavy screen wire, but its operation is identical with the guard shown in Figs. 1 and 3.

It is to be understood that this description is of the essential features of the invention, and that minor modifications are within the scope of the claims.

What I claim is:

1. A tether fastening comprising a post adapted to be inserted the necessary distance in the ground and around which the tethered animal may move, a disk or plate secured to the post at a predetermined distance from the ends thereof, and a rotatable guard of a more or less cylindrical form having openings in the ends thereof through which the post may pass, and an opening in the side thereof through which the tether may be secured to the post within the guard, whereby the guard may rotate on the disk or plate around the post.

2. A tether fastening, comprising a post adapted to be inserted the necessary distance into the earth, a plate secured to the post for limiting the distance it may be depressed into the earth, and a cylindrical guard rotatably mounted on the plate and having an opening in the side toward the bottom edge thereof and through which the tether may be passed so that it may be secured around the post, and means for preventing substantial movement of the guard longitudinally of the post.

CLAYTON J. CAWLEY.